June 17, 1930.  C. E. SWENSON  1,764,994
TRANSMISSION
Filed Nov. 5, 1926  3 Sheets-Sheet 1

Inventor:
Carl E. Swenson
By Wilson & McCanna
Attys.

June 17, 1930.  C. E. SWENSON  1,764,994
TRANSMISSION
Filed Nov. 5, 1926  3 Sheets-Sheet 2
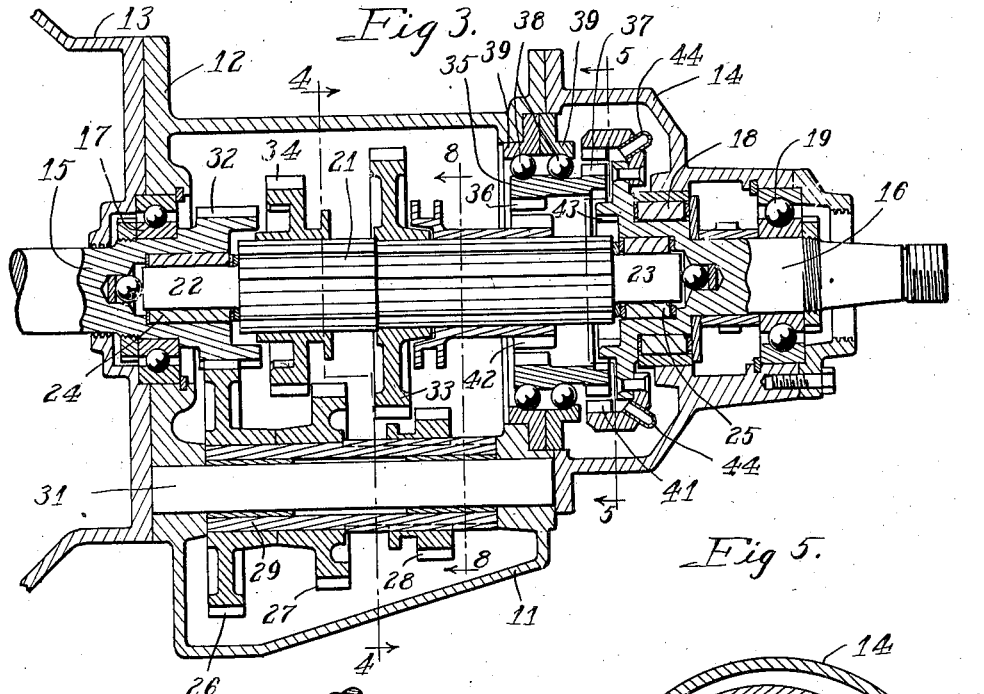
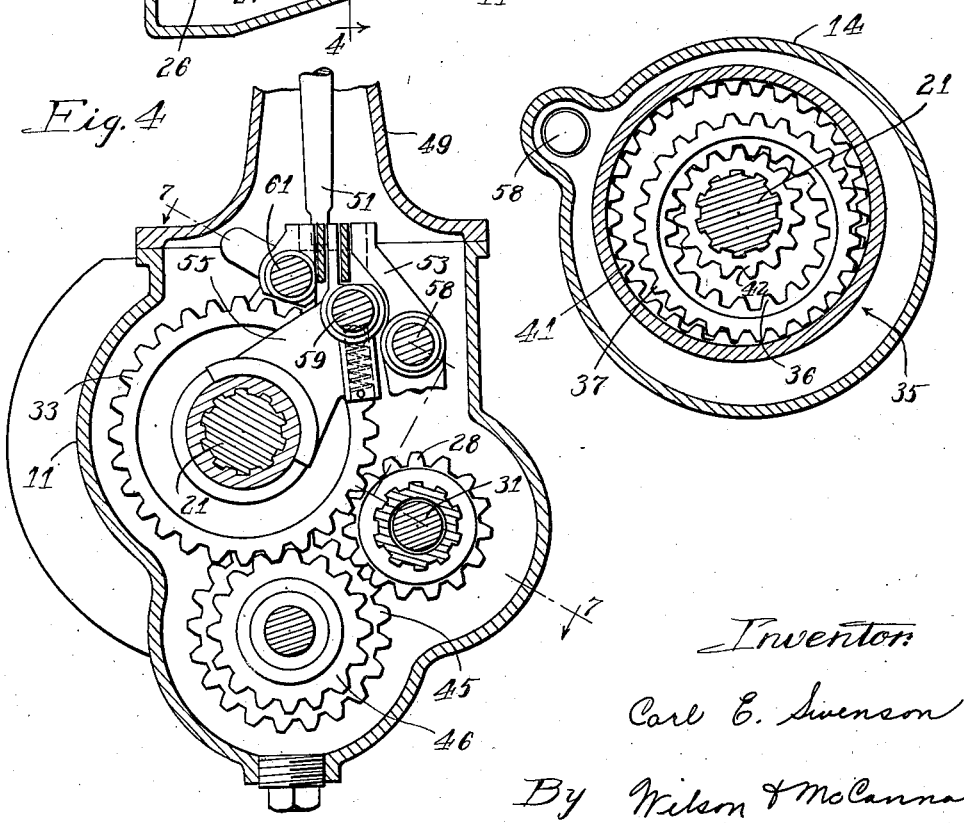
Inventor:
Carl E. Swenson
By Wilson & McCanna
Attys.

June 17, 1930.  C. E. SWENSON  1,764,994

TRANSMISSION

Filed Nov. 5, 1926   3 Sheets-Sheet 3

Inventor
Carl E. Swenson
By Wilson & McCanna
Attys.

Patented June 17, 1930

1,764,994

UNITED STATES PATENT OFFICE

CARL E. SWENSON, OF ROCKFORD, ILLINOIS, ASSIGNOR OF ONE-FOURTH TO LEVIN FAUST, ONE-FOURTH TO ERIC S. EKSTROM, AND ONE-FOURTH TO CARL L. ANDERSON, OF ROCKFORD, ILLINOIS

TRANSMISSION

Application filed November 5, 1926. Serial No. 146,456.

This invention relates to transmissions for motor driven vehicles and, while applicable to automobiles, trucks, tractors, and the like, either as a primary or an auxiliary transmission, I have here shown it for purpose of illustration merely, in a form suitable as the primary change-speed transmission for automobiles.

The present day automobile design has developed around the fact that the most extended driving or the greatest amount of driving is done with the motor propelling the car through one gear ratio only. The conventional car embodying a change-speed gear transmission usually has three speeds forward and one reverse, the third speed or direct drive being used to the greatest extent and the lower speeds, through gears, but momentarily, or for short durations. The principal reason for the lower gear ratios not being used more is that they are noisy. This makes a demand for good car performance based on operation at the high speed or direct drive ratio. These and other conditions are not desirable, since the power from an internal combustion engine drops almost directly as the speed and the heat efficiency is lowered greatly as the engine operates on lower compression. This is particularly noticed in climbing grades and when driving slowly on high either in congested traffic or where the going is hard. At the same time the engine must necessarily operate at a comparatively high R. P. M., causing undue noise and wear.

In view of these and other conditions and disadvantages, my invention contemplates the provision of a novel change-speed gear transmission having two high speeds, one direct and the other through gearing, these in addition to the lower change-speed ratios through gearing, whereby quiet and efficient gear ratios are provided, the direct high speed being for relatively easy going on our present day paved roads, and the other high speed being slightly lower for medium heavy pulling, such as moderate hills, or heavy traffic conditions, or where the car speed must necessarily be low. Thus, when operating on a fairly level, smooth highway the high ratio top speed or direct drive may be used, allowing the motor to operate efficiently at comparatively low R. P. M. and with minimum noise and wear. Under these conditions the pleasure of riding is greatly increased as well as the cost of operation reduced. When operating at the lower high speed, through gearing as disclosed hereinafter, the same advantages are found and, in addition, operation of the car is greatly facilitated since it is not necessary to change gears as frequently as with the present conventional transmissions.

The transmission or gear set contemplated by my invention provides two high speed, quiet, ratios, as described, these being in addition to the conventional lower and reverse ratios. The "low high" ratio, as it might be called, as well as the lower change-speed ratios, operate through a system of internal gearing, the principle of which is desirable and advantageous and which in its application as contemplated herein is particularly well suited to transmissions. Internal gearing as compared with external spur gearing is much more quiet, stronger and efficient. This is due to the fact that the gear teeth mesh and unmesh at a very small angle as compared with a pair of external gears, and there are also more teeth in contact, which reduces tooth pressures. The gear teeth of an internal-external gear combination as contemplated by this invention, have an exceptionally quiet action, and a gear unit of this kind is particularly desirable in the application of my improvements.

Another object of my invention is, therefore, to provide a change-speed gear set or transmission characterized by the use of an internal-external gear unit in combination with change-speed gearing constructed and arranged so that one or more speeds, through gears, are transmitted through said unit and a direct speed is transmitted without passing through said unit.

Still another object is to provide a transmission of the character described, constructed in such simple and novel manner as to be capable of economical production and adapted for serving in a practical and satisfactory manner the purposes intended.

Other objects and attendant advantages will be appreciated by those skilled in this art as the invention becomes better understood by reference to the following description when considered in connection with the accompanying drawings in which—

Figure 1 is an end elevation of a transmission or a gear set embodying my invention;

Figs. 2 and 3 are longitudinal sections taken substantially on the lines 2—2 and 3—3, respectively, of Fig. 1;

Figs. 4 and 5 are transverse sections taken substantially on the lines 4—4 and 5—5, respectively, of Fig. 3;

Figure 1:
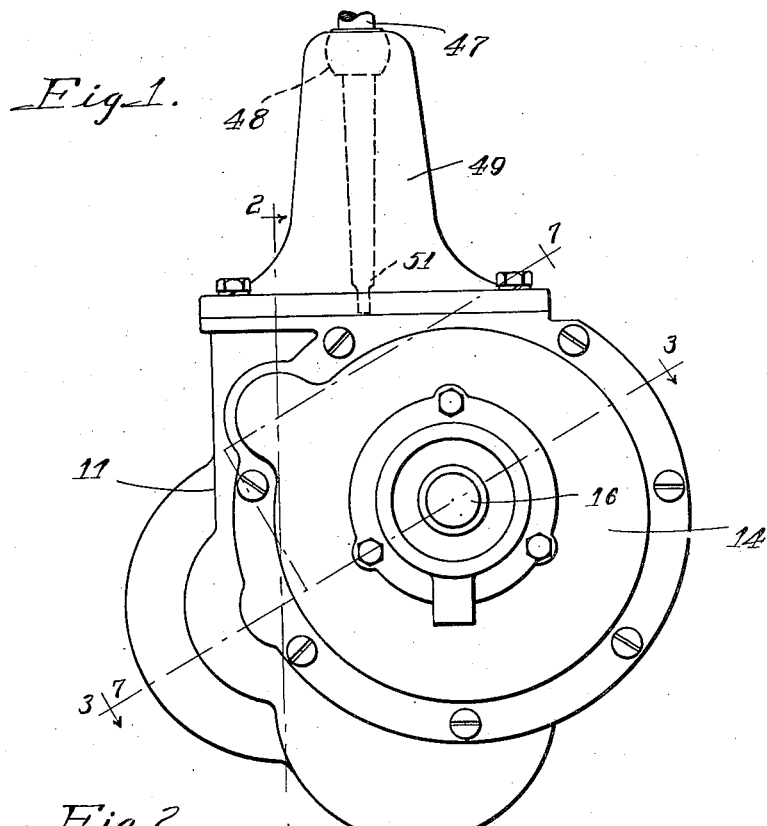
Figure 2:
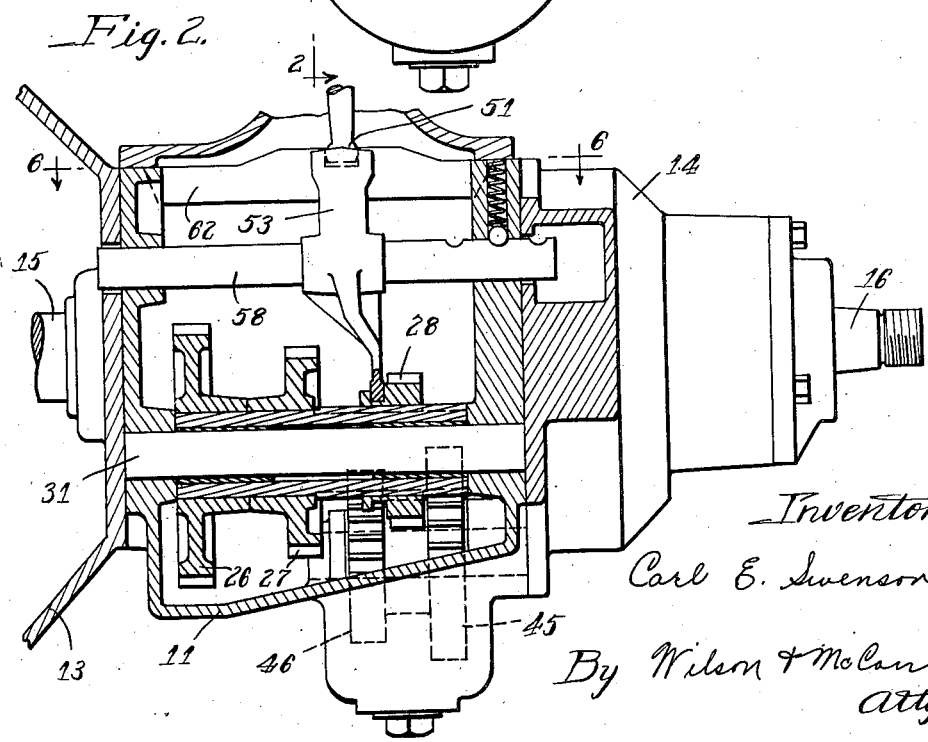
Figure 6:
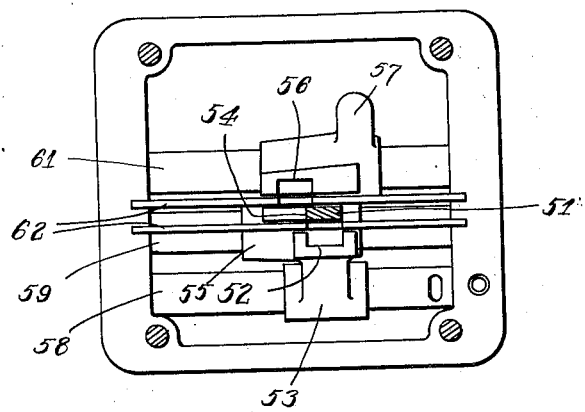
Fig. 6 is a plan section taken on the line 6—6 of Fig. 2.
Figure 7:
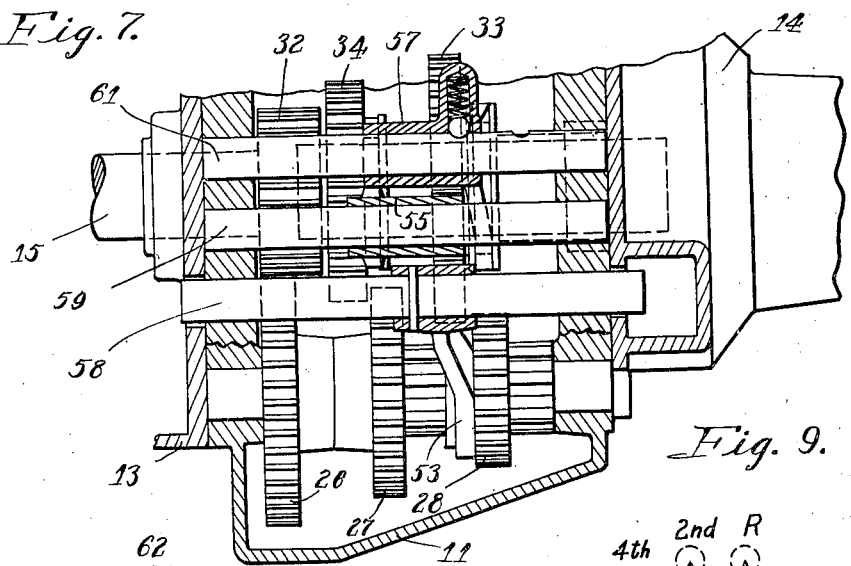
Fig. 7 is a fragmentary section taken substantially on the line 7—7 of Fig. 4.

The gear set or gear box as it is sometimes called in practice embodies a combination of gearing mounted preferably upon or within a single casing. This casing may, of course, be of sectional construction as is usually required either for convenience of the particular combination and organization of gears or for convenience or economy in manufacture. In the present instance I have shown for purpose of illustration merely, a gear set of this kind for producing three forward speeds and a reverse through an underdrive internal-external gear unit and a direct drive without passing through gears. It should be understood, however, that my invention is not confined to this particular general organization, except as hereinafter specifically claimed, but that it contemplates the use of said internal-external gear unit in various combinations with change-speed gears or the equivalent, whether in an under or overdrive arrangement.

Referring more particularly to Fig. 3 it will be observed that the casing in which the gearing is mounted comprises, in this instance, a main section designated generally by 11 constructed for attachment at its end 12 to a motor casing 13, or any suitable means of support, the casing 13 being a conventional clutch case. To the rear end of the casing section 11 is suitably attached a casing section 14. The front and rear casing sections are therefore, in effect, a single casing.

A drive shaft 15 and a driven shaft 16 are suitably journaled in the front and rear casing sections, respectively, the drive shaft in a bearing 17 and the driven shaft in bearings 18 and 19. An intermediate driven shaft 21 has reduced ends 22 and 23 journaled in bearings 24 and 25 in the driving and driven shafts, respectively. A plurality of countershaft gear 26, 27 and 28 are suitably mounted in the front section of the casing, gears 26 and 27 being fixed to a countershaft sleeve 29 and gear 28 being splined on this sleeve, the sleeve in turn being mounted for free rotation on a fixed countershaft 31. The gear 26 in this case is always in mesh with a gear 32 fixed to the driving shaft. The gear 28 is shiftable into mesh with a gear 33 fixed on the intermediate driven shaft 21 and a gear 34 splined on said shaft is adapted to be shifted rearwardly into mesh with the gear 27 or forwardly into clutching connection with the gear 32 for directly connecting the shafts 15 and 21. An internal-external gear unit or ring, designated generally by 35, having an internal gear 36 and an external gear 37 in laterally offset relation, is journaled in the casing so as to rotate about the shaft 21 eccentric thereto, as shown in Fig. 5. In this instance, the peripheral surface of the ring body is employed as a ball race and two sets of heavy balls 38 are employed for mounting the gearing. The outer races 39 are suitably secured to the casing and are accessible upon removing the rear casing section 14. An internal gear 41 fixed to the driven shaft 16, concentric therewith, meshes with the external gear 37, as shown in Fig. 5. A gear 42 splined on the shaft 21 is adapted to be shifted back and forth thereon between the position shown in Fig. 3 in which it meshes with the internal gear 36, as shown in Fig. 5, to a rearmost position in which it meshes with internal teeth 43 on the driven shaft 16, the latter connection being to clutch the intermediate driven shaft 21 directly to the driven shaft 16. Scoops 44 serve to pick up oil and convey it to the internal gearing, as the parts rotate.

By reason of this combination of gearing, assuming the gear 42 in the position shown in Fig. 3, the gear 28 may be connected to the gear 33 for producing the first or lowest speed forward, the line of transmission being from the drive shaft 15, through the countershaft gearing, the intermediate driven shaft, the eccentric gear ring 35, and the driven shaft. Connecting the gear 34 to the gear 27 produces the second speed, at a higher ratio, through the same train. Moving the gear 34 forwardly to directly connect the drive shaft 15 to the intermediate driven shaft 21 produces the third speed or, as above mentioned, the "low high" speed in which, it will be observed, the drive is transmitted through the internal-external gear unit which gives an underdrive and is particularly advantageous in that it has a quiet action and enables new combinations of gear ratios and rear axle ratios having certain advantages as above noted. Without disturbing the direct connection between the shafts 15 and 21 the gear 42 may be shifted rearwardly for directly connecting the shaft 21 and the ultimately driven shaft 16, thus obtaining the direct drive or high speed in which, it will be noted, the drive is not transmitted through gearing.

The reverse is obtained in this instance by shifting the gear 28 rearwardly into mesh with a reversing gear 45 which has a companion gear 46 in mesh with the gear 33. The reverse drive may, however, be obtained in other ways and, likewise, the change-speed gearing may be so arranged that the countershaft gears and the reversing gears do not rotate during either or both of the high speeds.

Figure 9:
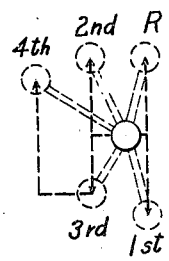
Fig. 9 is a diagrammatic view illustrating the control lever shift.
Figure 8:
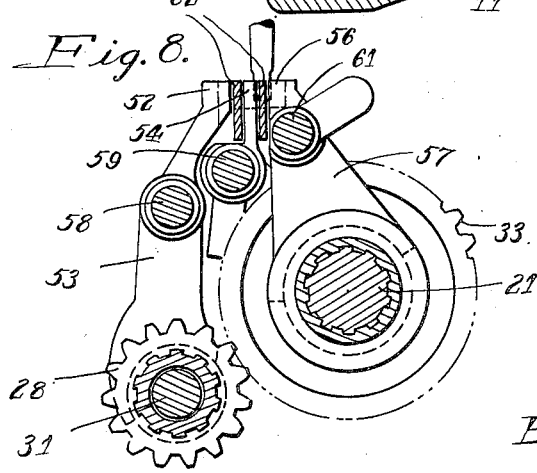
Fig. 8 is a cross section taken on the line 8—8 of Fig. 3.

My invention also contemplates a single control or shift lever for operating the various elements to obtain the changes in speed and direction of drive above noted. This comprises a single lever 47 having in this instance the usual ball mounting 48 in the cover 49 and adapted for shifting its lower end 51 into any of three laterally spaced operating positions. When shifted laterally its end 51 will be located in a socket 52 of a shifter fork 53 which controls the gear 28, and upon moving the lever backwardly to the "1st" position shown in Fig. 9 the gear 28 will be moved into mesh with the gear 33 for producing the first speed, as above described. Upon moving the lever forwardly to "R" position shown in Fig. 9 the gear 28 will be connected to the reversing gear 45, for reversing. Upon returning the lever to the neutral position and then moving it to the left to engage its end 51 in the notch 54 of the yoke 55 which controls the gear 34, it may be moved forwardly for establishing the second speed, and rearwardly for the third speed, as will be obvious. Upon moving the control lever from the third position further to the left its selector end 51 will be engaged in the notch 56 of the yoke or fork 57 which controls the gear 42, and upon then shifting the lever forwardly to the "4th" position shown in Fig. 9 the high or direct speed will be obtained, it being here noted that in this position the gear or clutch remains in connection with the driven shaft and the gear 42, which becomes a clutch element, connects the shaft 21 to the driven shaft 16. In this instance, the fork 53 is fixed to a slide rod 58 and the forks 55 and 57 are mounted to slide on fixed rods 59 and 61, respectively. In each instance, a suitable spring pressed ball or equivalent detent is employed, as well known in this art, for yieldingly retaining each fork in its shifted position. Guide plates 62 serve to guide the upstanding ends of the shifter forks.

It is believed that the foregoing conveys a clear understanding of the principles of my invention; and it should be understood that in practice the internal-external gear unit may be employed in different arrangements with change-speed gearing. In these modifications either an overdrive or an underdrive arrangement may be employed and the invention may be used either in a primary or an auxiliary transmission. It will be manifest, therefore, that my invention is in no way confined to details of construction and that changes may be made in the construction and arrangement without departing from the spirit and scope of the invention as expressed in the appended claims.

I claim:

A transmission for motor vehicles comprising, in combination, a driving shaft, a driven shaft, an intermediate driven shaft, said shafts being in coaxial relation, a plurality of counter-shaft gears, a gear on the driving shaft in mesh with one of the counter-shaft gears, a shiftable gear splined on the intermediate driven shaft movable into and out of selective connection either with one of the counter-shaft gears or with the driving shaft, a gear fixed to the intermediate driven shaft, one of the counter-shaft gears being splined and adapted for selective connection with said fixed gear, internal-external gears rotatable about the intermediate driven shaft eccentric thereto, an internal gear on the driven shaft in mesh with said external gear, and a second shiftable gear splined on the intermediate driven shaft adapted for selective connection either with the first mentioned internal gear or with the driven shaft.

In witness of the foregoing I affix my signature.

CARL E. SWENSON.